Patented May 6, 1930

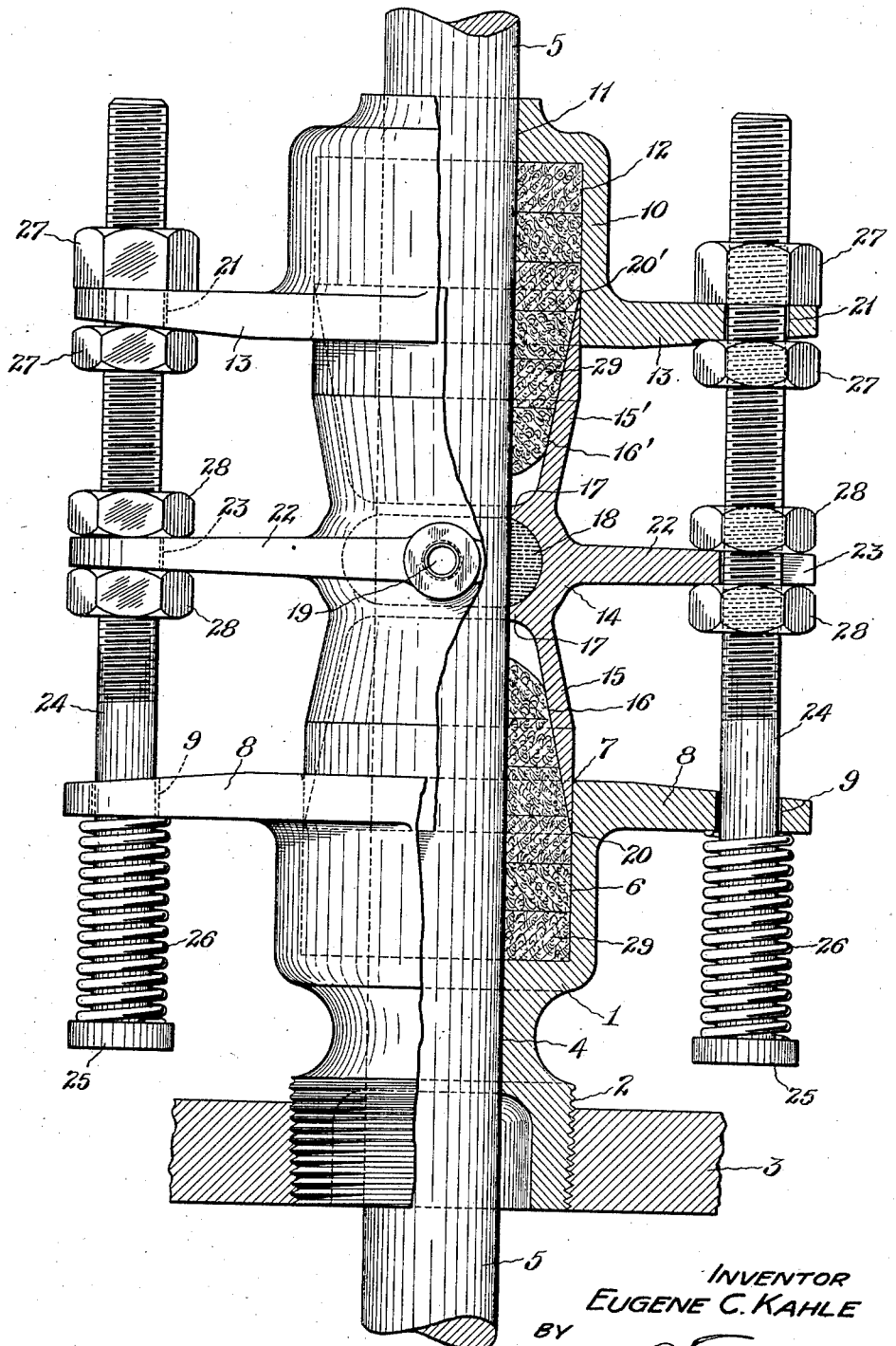

1,757,311

UNITED STATES PATENT OFFICE

EUGENE C. KAHLE, OF VENUS, PENNSYLVANIA

STUFFING BOX

Application filed April 15, 1925. Serial No. 23,301.

My invention relates to stuffing boxes, and particularly to that class thereof shown, described and claimed in U. S. Patent No. 1,015,685 issued to me January 23, 1912.

In said patented device, the arrangement is such as will utilize what frictional engagement there may be between the piston-rod or other moving element and the packing in the stuffing box, to compress such packing when such movement is in one direction.

The object of my invention is to utilize such frictional engagement to compress the packing when the piston-rod or the like moves in either of its two directions of longitudinal movement.

Another object is to provide means whereby lubricant may be supplied to the parts sliding through the box and with a minimum of loss by leakage.

To the above ends, I have modified and amplified the said patented construction, as will be hereinafter fully described and particularly set forth in the claims.

The annexed drawing and the following description set forth in detail certain means embodying my invention, the disclosed means, however, constituting but one of the various mechanical forms in which the principle of the invention may be employed.

In said annexed drawing, the figure represents partly in side elevation and partly in axial section, a stuffing box embodying my invention and as particularly applied to a piston-rod of an engine or pump or the polish-rod of an oil-well pump.

The illustrated embodiment of my invention includes a member 1 which, in this particular instance, is formed with a threaded end-portion 2 which may be screwed into the head 3 of the cylinder or tubing of the well pump. This member is further formed with the cylindrical bore 4 in which the rod 5 slides, which bore communicates with a cylindrical primary packing chamber 6 also formed in said member and intersecting its outer end 7. This outer end is formed with two radially extending wings 8—8 each formed with a hole 9 as shown.

A second member 10 is also provided formed with the bore 11, primary chamber 12 and radial wings 13—13, substantially idential with member 1, but reversed in position as also shown.

Intermediately of these two members is a member 14 having two walls 15 and 15′ each of annular cross-section and forming an interior frusto-conical secondary packing chamber, 16 and 16′ respectively, the central part of the member being formed with bearing walls 17—17 which form between them a lubricant chamber 18 having an inlet duct 19 into the threaded outer end of which a grease cup (not shown) may be screwed.

The end portion of the outer surface of each wall 15 and 15′, is cylindrical in form and of an outer diameter such as will permit it to slip and snugly fit into the adjacent primary member, as shown, the inner and outer surfaces of each such secondary member intersecting each other to form a knife edge, 20 and 20′ respectively.

The wings 13 of member 10 are provided with the holes 21—21 similar to holes 9—9, and the intermediate member 14 is provided with the two radially extending wings 22—22 provided with end slots 23—23 in alinement with the holes 9—9 and 21—21.

Extending through the two sets of alined holes and slots, 9, 21 and 23 respectively, are two bolts 24—24, one end of each of which is provided with a head 25 between which and the adjacent wings 8—8, are interposed helical springs 26—26. The outer end of each such bolt is threaded and engaged by two lock-nuts 27—27 whereby the wings 13—13 and hence the secondary member 10 may be fixed relatively to such bolts, as will be understood.

Said threaded portion of each bolt is extended so as to receive two lock-nuts 28—28 by means of which the intermediate member 14 may be fixed relatively to said bolts, as will be understood.

Primary chamber 6 and secondary chamber 16 together form an enclosed packing space into which suitable packing 29 may be placed, preferably in the form of rings as shown.

In practice the chamber 6 alone is at first filled with packing as in the case of my above-mentioned patented device, and as it becomes worn is pressed into chamber 16, new packing being added to chamber 6 from time to time as required.

The same procedure is followed in connection with the other packing space formed by the primary chamber 12 and secondary chamber 16'.

The springs 26 hold the member 14 in its proper position relatively to the primary member 1.

On the up-stroke of the rod 5, the frictional engagement thereof with the packing in the lower packing space will compress or tend to compress the packing therein, thus preventing or minimizing leakage of fluid from the cylinder of the engine or tubing of the well, past the rod 5 and out. On the down stroke, the packing in the upper packing space is likewise compressed and similar leakage prevented or minimized.

It will be noted that the lubricant chamber 18 is bounded by the rod itself so that the lubricant in such chamber is in constant contact therewith and is transferred to it and carried into the packing chamber, thereby lubricating the packing therein and minimizing its destruction by wear or overheating.

The packing being intermittently compressed as above described also prevents any leakage and hence waste of the lubricant.

When it is desired to readjust or renew the packing, the nuts 27 and 28 may be manipulated for this purpose or the bolts unscrewed and removed as will be readily understood by those skilled in the art.

While I have shown but one application of my device, many other applications thereof for other purposes will suggest themselves to those having occasion to use this device.

For example, it may be used as an oiling device for wire-lines used in the oil fields or as a packing device in swabbing oil wells, these being only some of the various uses to which the device may be well applied.

Where this invention is applied to engines, compressors, gate valves, casting heads and the like, the member 1 as a separate part attached as shown by threads, may be dispensed with and its equivalent made in the form of an integral part of the engine or compressor cylinder, gate valve casing, or a casing head, the structure otherwise being similar to that shown and including primary and secondary packing chamber, together forming a packing space used as above described.

As shown in the drawing the interior diameters of the members 1 and 10 are made equal to each other, as are the outer diameters of the cylindrical end portions of the intermediate member 14. The intermediate member is hence reversible, and either end thereof may be caused to engage the interior of either of the main members, thereby facilitating the assembly of the device, as will be understood by those skilled in the art.

What I claim is:

1. A stuffing-box for piston rods or the like comprising two alined, spaced main members each formed with a cylindrical packing chamber; an intermediate member having at each end a frusto-conical packing chamber and an outer cylindrical surface fitting within the packing chamber of the adjacent main member; and means for adjusting said main and intermediate members relatively to each other, said means including a device resiliently maintaining the intermediate member in adjusted position relative to one of said main members.

2. A stuffing-box comprising two spaced main members each formed with a cylindrical packing chamber; an intermediate member having a smooth central bore and a lubricant port communicating with said bore, said intermediate member also having at each end a frusto-conical packing chamber and an outer cylindrical surface fitting within the packing chamber of the adjacent main member; and means for adjusting said main and intermediate members relatively to each other, said means including a resilient device maintaining the intermediate member in position relative to one of said main members.

3. In a stuffing-box having two spaced main members formed with cylindrical chambers having open ends facing each other, an intermediate member having at each end a smooth outer cylindrical surface and a frusto-conical chamber cooperating with the cylindrical chamber of the adjacent main member to form a packing chamber, said intermediate member also having a middle portion formed with a smooth bore and a lubricant port communicating with said bore, and means for slidably and adjustably securing the intermediate member to one of the main members.

Signed by me this ninth day of April, 1925.

E. C. KAHLE.